US008782095B2

(12) United States Patent
Al-Khatib

(10) Patent No.: US 8,782,095 B2
(45) Date of Patent: Jul. 15, 2014

(54) METHOD AND SYSTEM FOR PROGRAMMING AT RUN-TIME AND DYNAMIC BUSINESS APPLICATION

(76) Inventor: Abdullah Nabil Al-Khatib, Jubail Industrial (SA)

( * ) Notice: Subject to any disclaimer, the term of this patent is extended or adjusted under 35 U.S.C. 154(b) by 363 days.

(21) Appl. No.: 12/794,204

(22) Filed: Jun. 4, 2010

(65) Prior Publication Data

US 2011/0022577 A1    Jan. 27, 2011

Related U.S. Application Data

(60) Provisional application No. 61/227,979, filed on Jul. 23, 2009.

(51) Int. Cl.
*G06F 17/30* (2006.01)
*G06F 7/00* (2006.01)

(52) U.S. Cl.
USPC ......................................................... 707/802

(58) Field of Classification Search
USPC ......................................................... 707/802
See application file for complete search history.

(56) References Cited

U.S. PATENT DOCUMENTS

| | | | |
|---|---|---|---|
| 6,269,474 B1 * | 7/2001 | Price ............................. | 717/104 |
| 6,999,956 B2 * | 2/2006 | Mullins ............................... | 1/1 |
| 8,219,987 B1 * | 7/2012 | Vlaovic et al. ..................... | 718/1 |
| 2004/0056894 A1 * | 3/2004 | Zaika et al. .................. | 345/762 |
| 2005/0160104 A1 * | 7/2005 | Meera et al. .................. | 707/100 |
| 2006/0236310 A1 * | 10/2006 | Domeika et al. .............. | 717/140 |

* cited by examiner

*Primary Examiner* — Kuen Lu
(74) *Attorney, Agent, or Firm* — Sughrue Mion, PLLC

(57) ABSTRACT

A method and system for Dynamic Business Application with a run-time development environment uses Application Intelligence to reduce programming efforts and avoid the "compile-execute" cycle. The approach may be especially useful in the context of an ERP solution platform working with various database engines and multiple, including right-to-left, languages.

15 Claims, 11 Drawing Sheets

*Method and System for Programming at Run-Time and Dynamic Business Application*

Run-Time Programming Tools

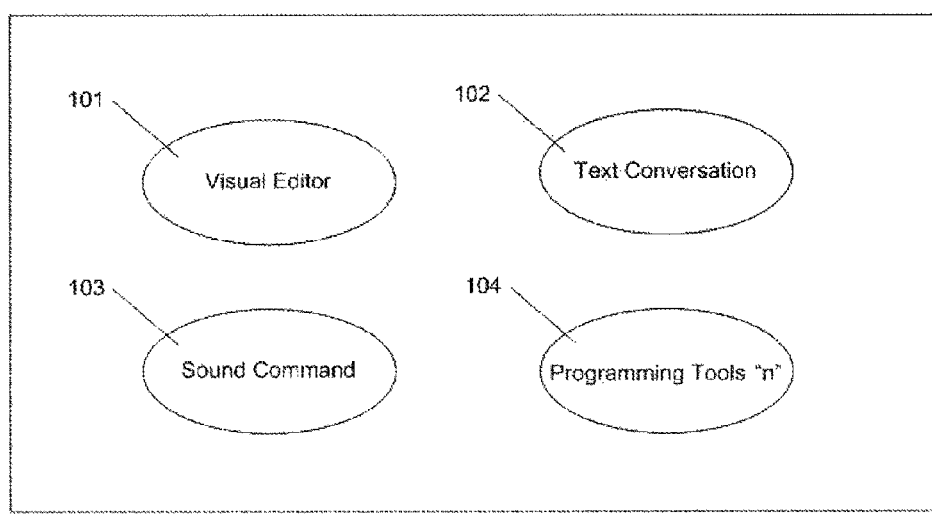
Figure 1.1

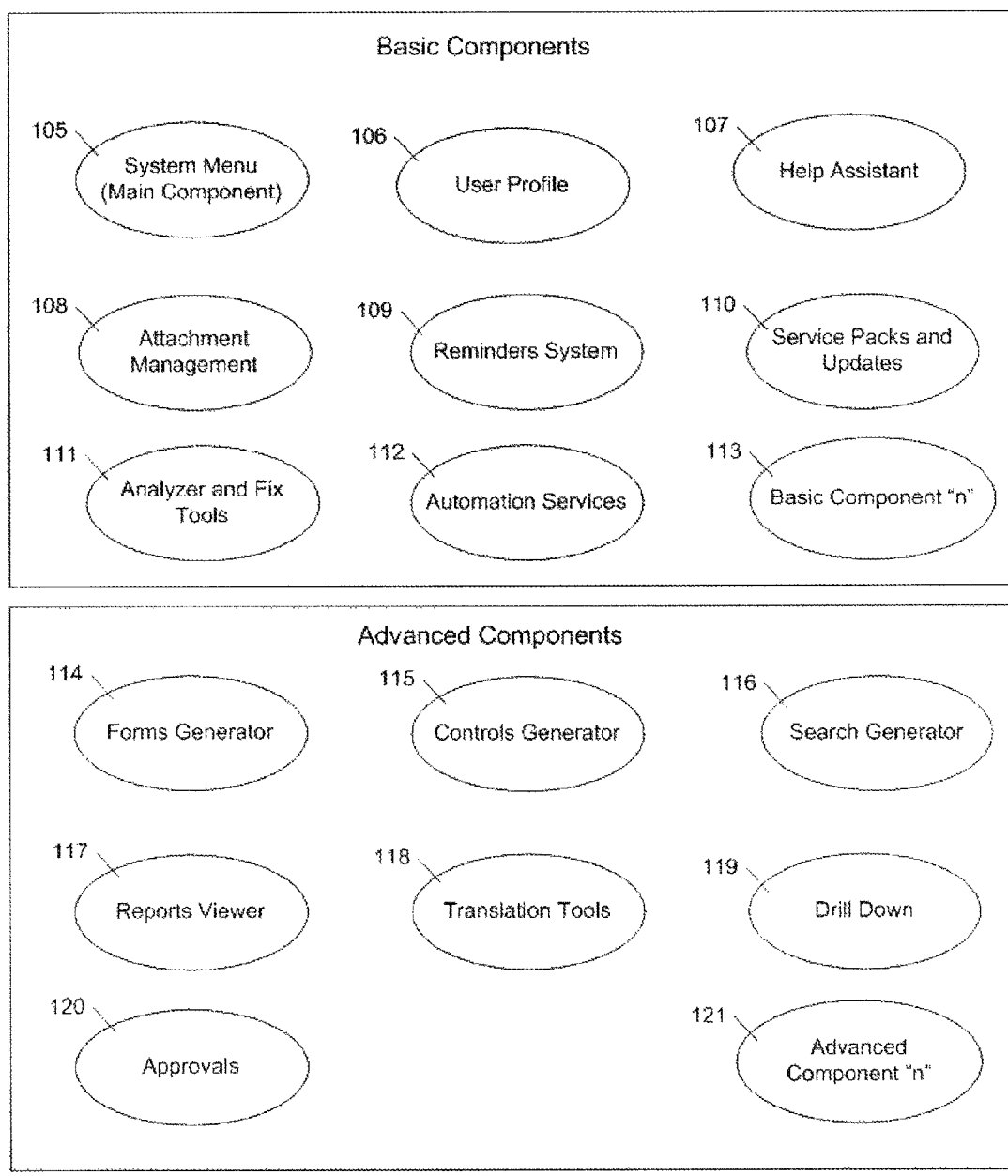
Figure 1.2

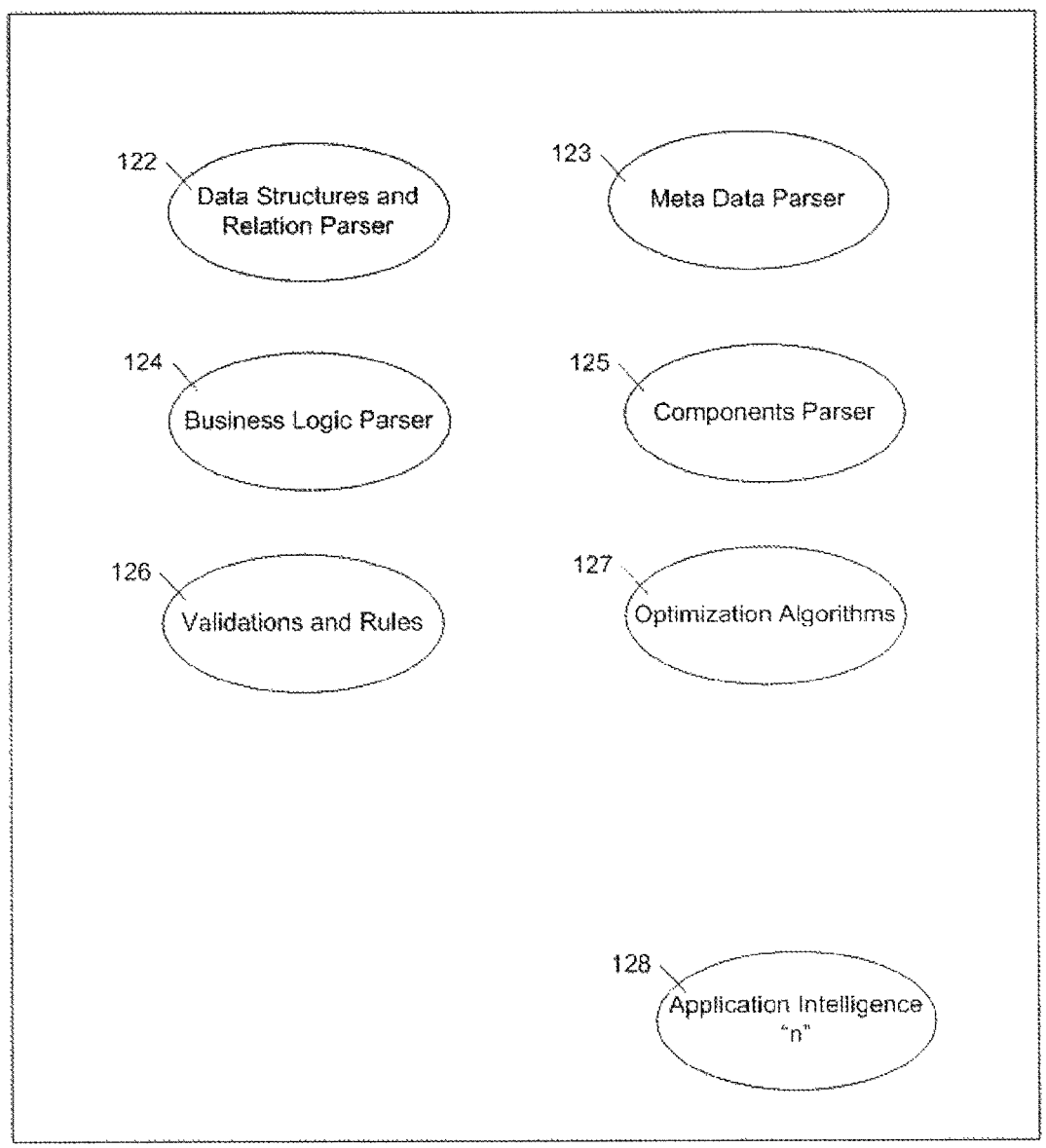
Figure 1.3

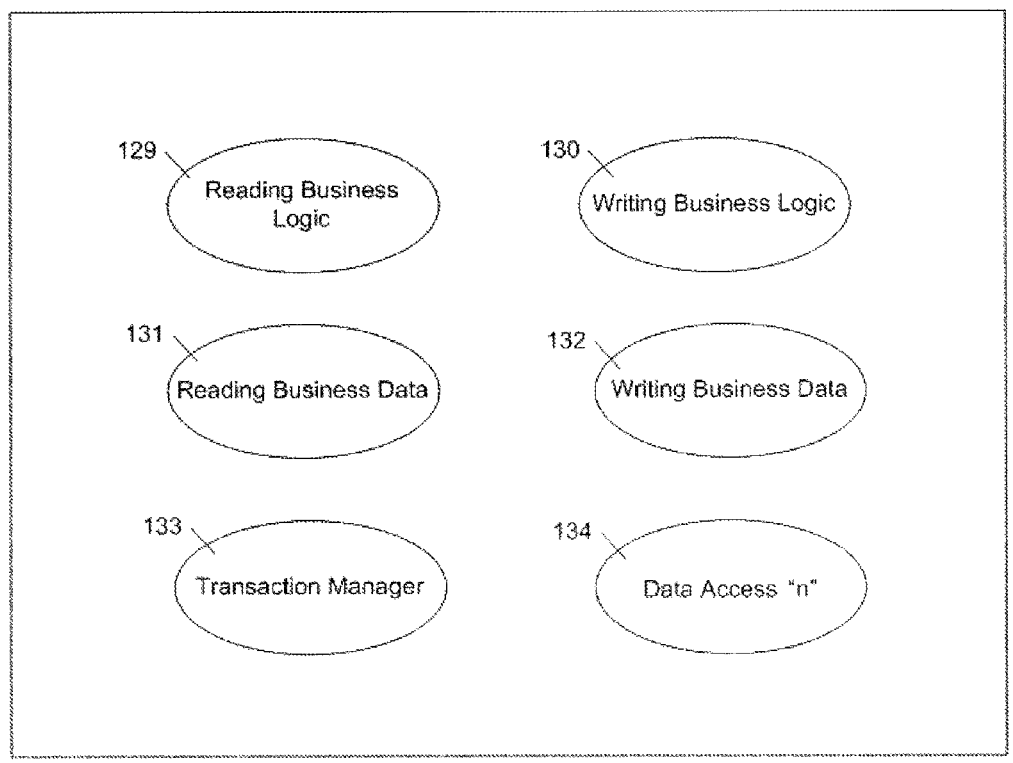
Figure 1.4

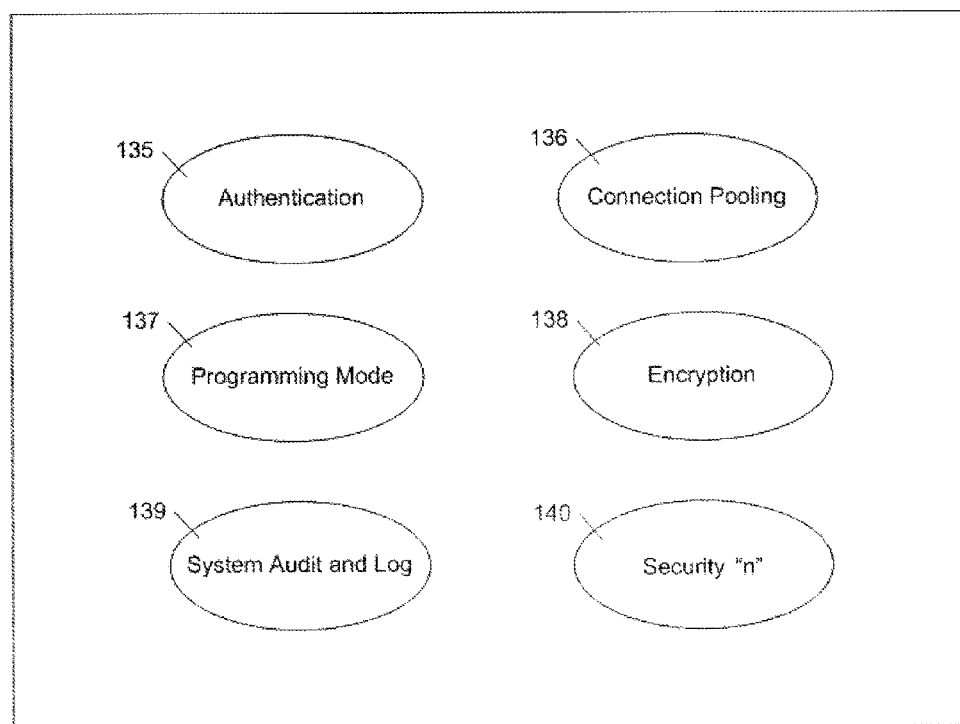
Figure 1.5

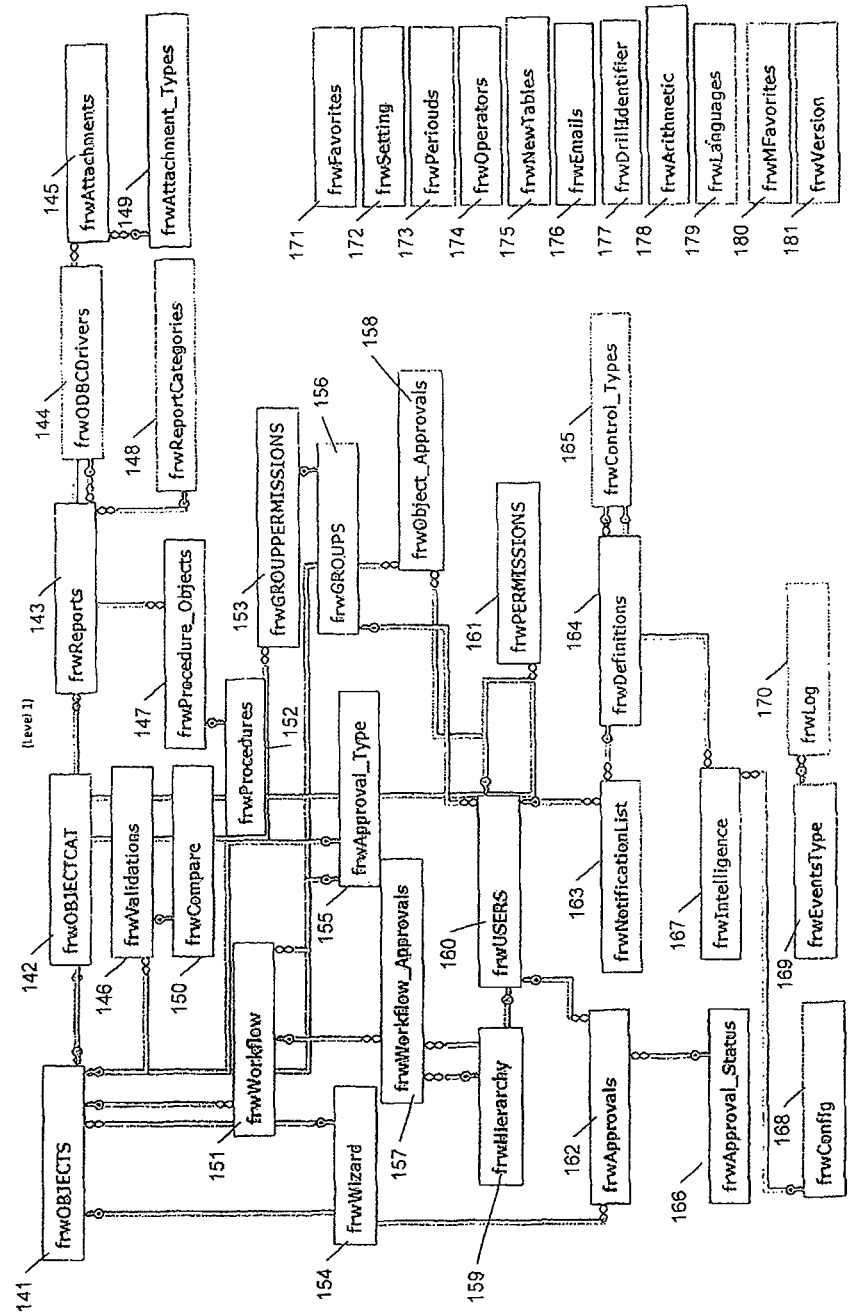
Figure 1.6

*Method and System for Programming at Run-Time and Dynamic Business Application*
Run-Time Programming Tools
(Level 2)
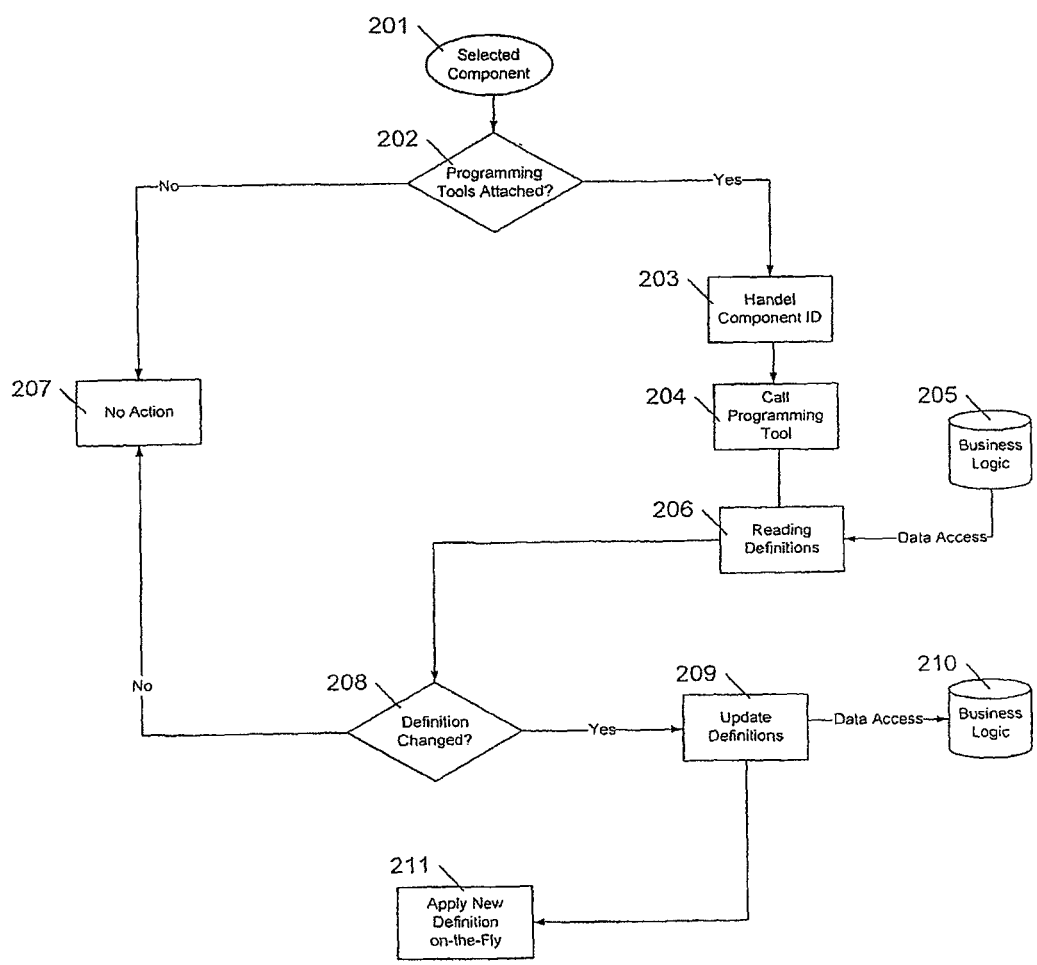
Figure 2.1

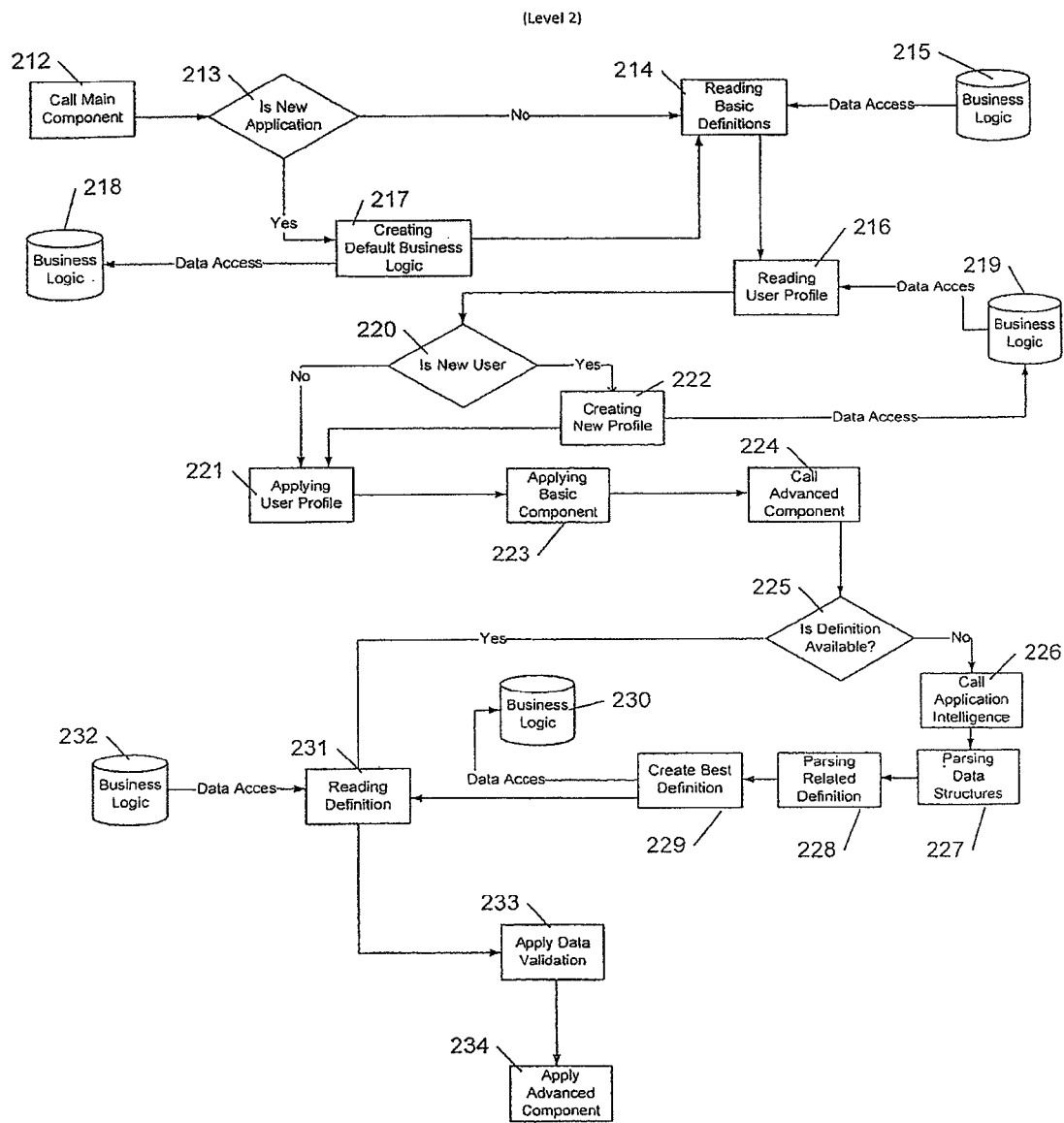
Figure 2.2

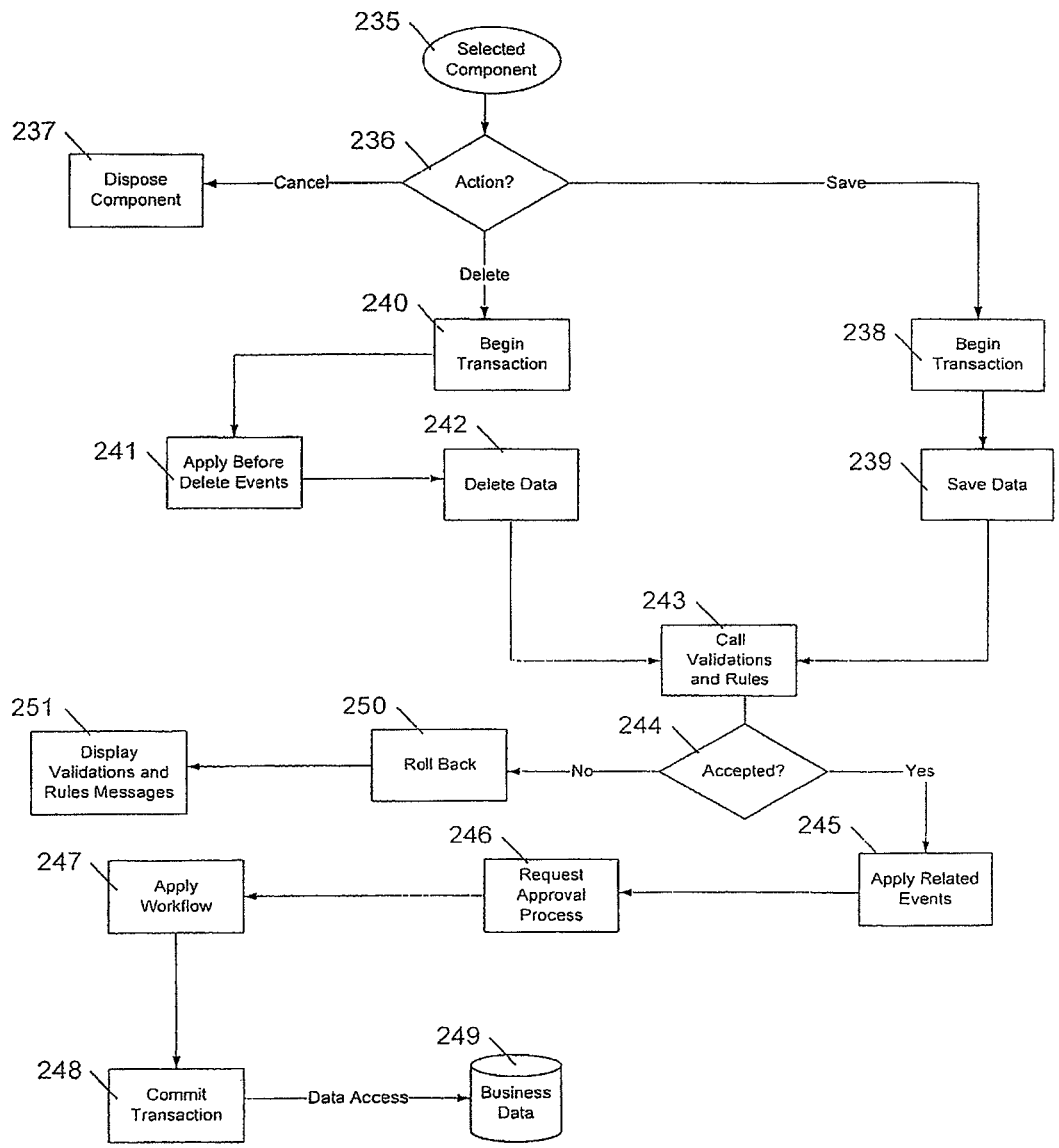
Figure 2.3

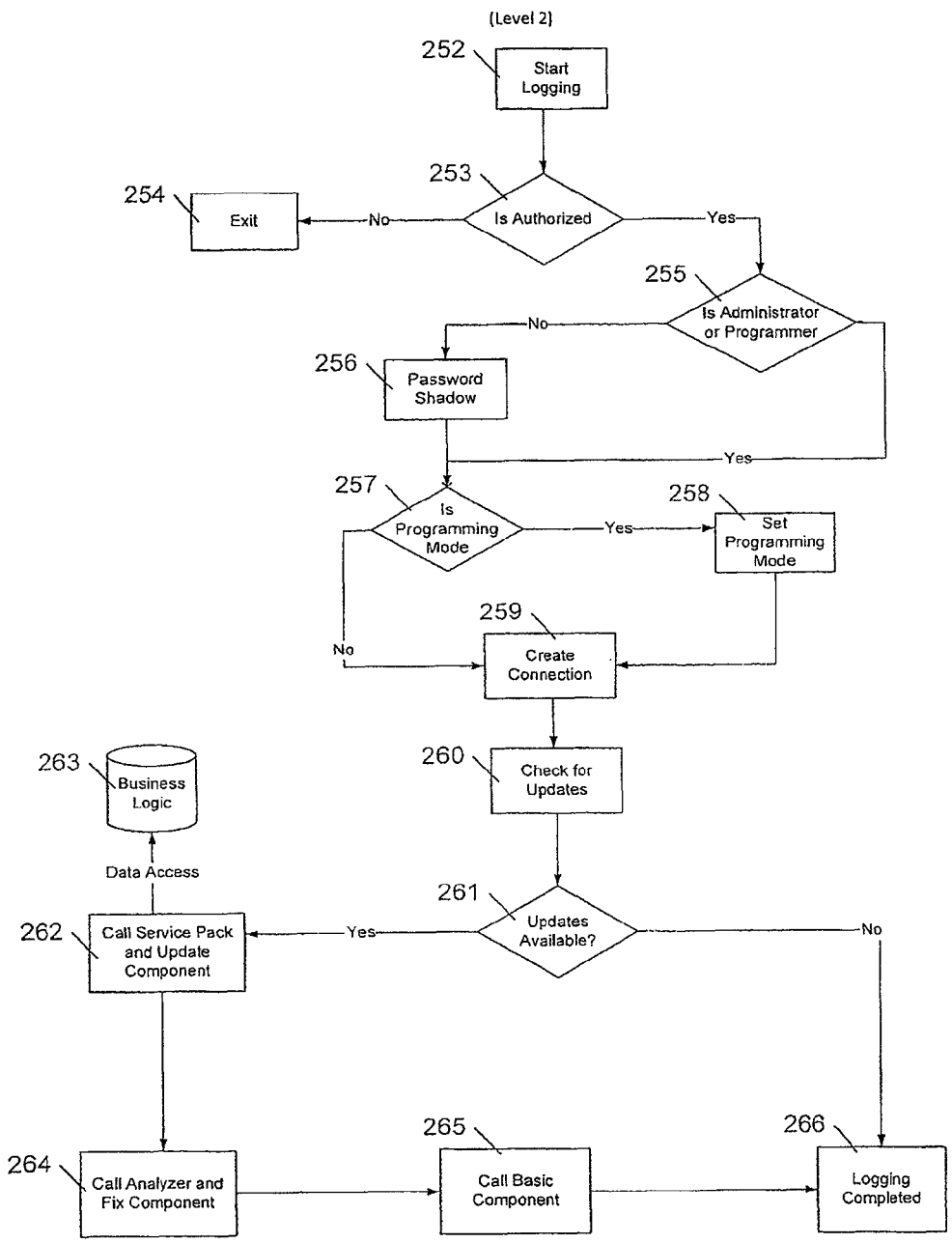
Figure 2.4

METHOD AND SYSTEM FOR PROGRAMMING AT RUN-TIME AND DYNAMIC BUSINESS APPLICATION

CROSS REFERENCE TO RELATED APPLICATIONS

This application claims priority to a U.S. Non-Provisional Application No. 61/227,979 filed on Jul. 23, 2009.

FIELD OF THE INVENTION

This invention relates to computer software application development environments. More specifically, this invention relates to software application development environments at "Run-Time" and Dynamic Business Application—while viewing application data—which utilizes Application Intelligence to reduce programming efforts and avoid the "compile-execute" cycle.

BACKGROUND OF THE INVENTION

Due to the need of business rules and business change management to cope with the continuous changing market business rules and regulations, the need for a dynamic application that can efficiently and quickly change and adapt to this market challenge is becoming essential.

SUMMARY OF THE INVENTION

InnovBase has achieved this, as an innovative development environment and business platform for Enterprise Resource Planning (referred to as ERP) and database applications, by means of several important features including at least the following:
1. Reduction of 50% or more in development time and cost.
2. Utilization of database structure and relations to initially build the application.
3. The realization of an approach, environment, and system hat is very close to a natural way of human understanding.
4. Increasing focus on business logic.
5. Reduction of risks and system disasters.

One of the major ERP technical problems is the application flexibility. Most of the ERP applications and their underlying logic are hardcoded and, in the best case, one can change only limited functions and configurations. The functions and configurations that can be changed are quite limited when compared with a customer's actual needs for change. An important purpose of InnovBase, among other purposes, is to help reducing the database applications development cycle, especially to avoid the "compile-execute" aspect of the development cycle, and to make the development of ERP solutions in particular more effective.

The invention is taught below by way of various specific exemplary embodiments explained in details and illustrated in the enclosed drawing figure or figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention.

FIG. 1.1 is an object diagram of the main run-time programming tools

FIG. 1.2 is an object diagram of the two parts of the system components, Basic and Advanced FIG. 1.3 is an object diagram of the different application intelligence parsers FIG. 1.4 is an object diagram of the read/write data access process FIG. 1.5 is an object diagram of the different security protocols FIG. 1.6 is a detailed object diagram of the business logic common functions library FIG. 2.1 is a detailed object diagram of FIG. 1.1
FIG. 2.2 is a detailed object diagram of FIG. 1.2
FIG. 2.3 is a detailed object diagram of FIG. 1.4
FIG. 2.4 is a detailed object diagram of FIG. 1.5

DETAILED DESCRIPTION OF THE INVENTION

Figure 1:
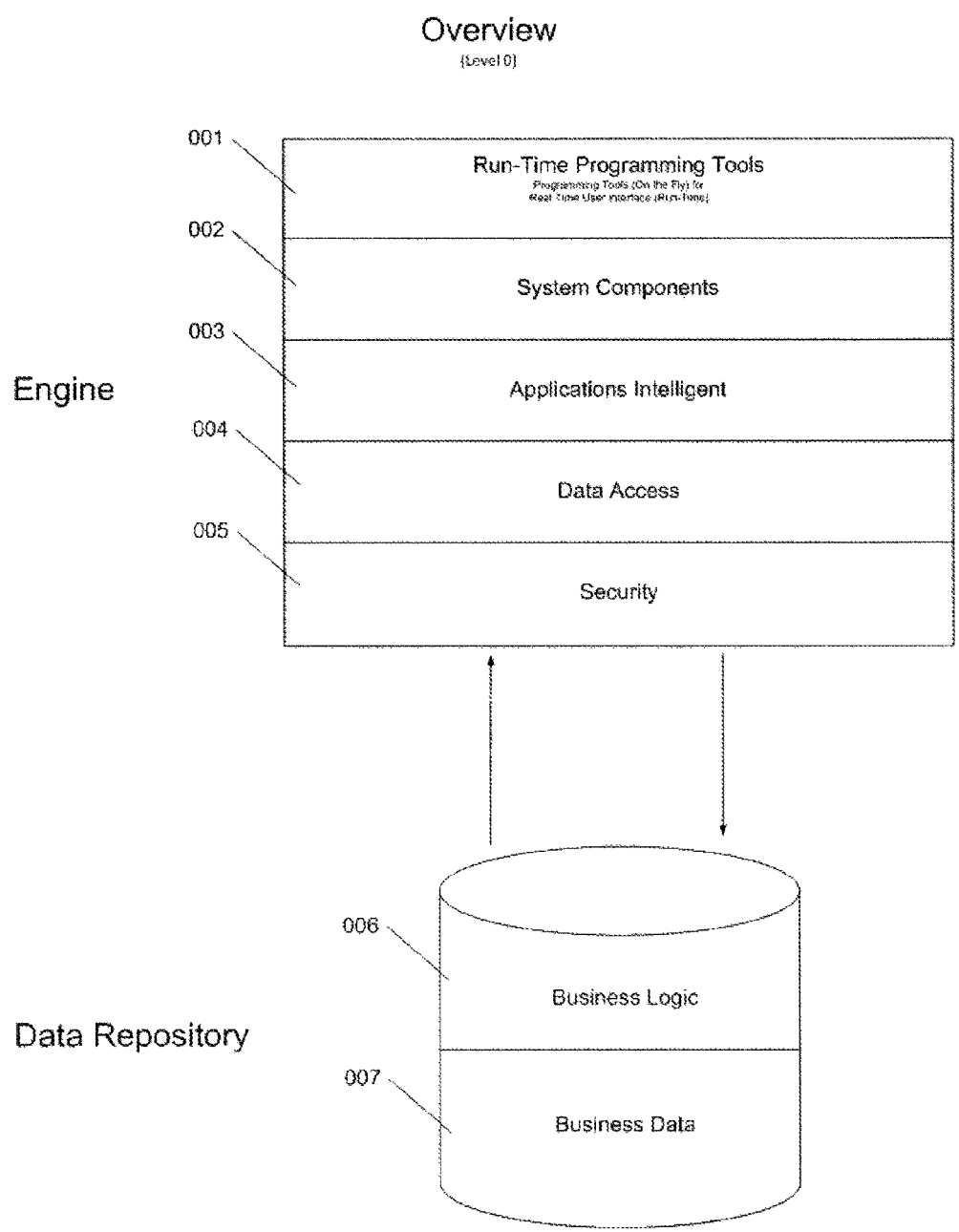
FIG. 1 is a diagram of the primary parts of InnovBase, the Engine and Data Repository. The Engine contains the main elements of InnovBase and the Data Repository contains the Business Logic and Business Data.

Facts and Statistics a. All of the previous framework and component size does not reach 3 MB (700 KB compressed) excluding system pre-requirements such as Database Engine.

b. Application size will never increase even with huge ERP implementation since everything will be stored in the database.

c. Support efforts after implementation has been reduced (at least by 60%).

d. First Business Language which completely (100%) segregates between Business Logic and hard code.

e. Easy to learn (i.e. Developer training will not exceed 24 hours if the Developer has Database knowledge).

f. First Business Language that have native connection to Industrial Data.

Summary

We claim the previous combination of ideas taken in combination with the system design. Even though some of the identified concepts above have been individually discussed in the prior article, there is a distinct difference in that all of the features mentioned above with respect to the database application, including system behavior and development tools, have been made at run-time. Also, according to an embodiment of the invention, an Application Intelligence engine "Framework" has been added to reduce programming efforts for standard and repeated works such as linking screens and fields with a database and selecting the suitable controls for the data type.

Many variations to the identified embodiments above are possible without departing from the scope and spirit of the invention. Possible variations have been presented throughout the foregoing discussion. Moreover, it will be appreciated that Combinations and sub-combinations of the various embodiments described above will occur to those familiar with this field, without departing from the scope and spirit of the invention.

DETAILED DESCRIPTION

Overview (Level 0)
Engine
Process (001) Run-Time Programming Tools

This is one of the primary distinct features of the patent. All System Components can make changes instantly while viewing data. No need for compile-execute process or data reloading. This is highly protected layer and cannot be accessed without the proper privileges called Programming Mode.

Example since all components will be created at first-time calling, screens are neither pre-designed nor pre-created but are created instantly when called.

Process (002) System Components

There are two types of components; Basic Components like system menu which is initially called and Advanced Components such as Form Generator. Both types behavior depends on Application Intelligence requests.

Process (003) Application Intelligence

Application Intelligence plays a very critical role; it builds screens (not the developer), optimizes performance, analyzes table relations and based on these relations it builds drill down and has tight relation with the System Components where most of them have communication channels with Application Intelligence.

Upon the arrival of data from Business Logic and Business Data, it analyzes the data, parses it and run certain algorithms then displays the data in the best possible way using the System Components interface that best fit the data. This reduces the development efforts.

Example 1 the developer wants to create a screen; all the user needs to do is selecting the table and the Application Intelligence will build the screen for him.

Example 2

Translation. We want to write the screen in the previous example in Arabic, Application Intelligence will check if a translation was made before and use it. If no translation was make, it then looks into the dictionary attached with the system and if it cannot find anything either, it asks the developer on-the-fly to provide the proper translation.

Example 3

Drilldown. Based on table relations, Application Intelligence can find out where to go on drilldown.

Process (004) Data Access

This layer takes care of reading/writing from and to the database for Business Logic and Business Data alike. It also manages the connection to guarantee committing or rolling-back database transactions. This layer will help communicating with the database so say we have a distributed database then this data access layer will manage this process.

Process (005) Security

Since this is a very flexible method and system to build applications, we focus a lot on security. Platform environment security is used such as operating system and database security. For example, in Windows we use domain security.

Several enhanced techniques are also used like user shadow to protect both Business Logic and Business Data. This will stop backdoor security preach attempts.

Data Repository

InnovBase segregates completely between programming definitions (development) and end-user data entry and maintain each in a separate repository Process (006) Business Logic This is where the programming definition like screen layout, formulas, fields, control type that are related to application. No end-user data will be stored in this section. Therefore, the Business Logic size will always be minimal and this makes it dynamic and compile free.

Export-Import InnovBase (Script-Execute) functionality is also available. Customers may benefit from other customers success stories so this tool help new customers to adopt other customers Business Logic and this makes customers comfortable knowing their data is secured and only the structure of the database Business Logic is exported.

Process (007) Business Data

This is where the end-user entered data stored. Business Logic Updates never interfere or cause problems to the Business Data that the end-user builds. This is a major advantage for the InnovBase over other ERP systems because it eliminates classic update problems.

Run-Time Programming Tools (Level 1)

Run-Time Programming Tools

Process (101) Visual Editor

This is the $4^{th}$ Generation Language common editor. Developer can manipulate any component properties or controls using the mouse right-click menu option.

Process (102) Text Conversation

This is chat functionality between the developer and the system and based on the questions and answers the system will layout for example the screen accordingly to this conversation.

Process (103) Sound Command

This is sound commands functionality where the developer speaks out the required commands and the system will layout for example the screen according to these sound commands rather than visual or text.

Process (104) Programming Tools "n"

This can be any programming tool such as Brill recognition. All programming tools are made on-the-fly while viewing data and their effect is immediate and no need for compile-execute cycle.

Data Repository

Process (105) Basic Components

This contains main system menu, modules, objects for each module and system options.

Process (106) User Profile

This contains user preferences, colors, short cut, etc.

Process (107) Help Assistant

To make the system user friendly, visual help is available and provides interactive error messages and warnings.

Process (108) Attachment Management

Users can attach any type of document anywhere in the system.

Process (109) Reminders Functionality

Developers can add Reminders anywhere for any field of their liking under any condition or rule. For example, Reminders can be added to Expiry Dates Process (110) Service Packs and Updates To guarantee the stability of the system, this component is responsible to carry out all updates properly; i.e. update Business Logic structure while having the content of Business Logic and Business Data intact.

Process (111) Analyzer and Fix Tools

This tool scans and detects Business Logic definition problems and suggests solutions. Furthermore, it gives the user the opportunity to compare with other Data Repository Business Logic to help making a better decision.

Process (112) Automation Service
  Managing communication, workflow, system notification and parsing incoming communication like emails, SMS, etc.
Process (113) Basic Component 'n'
  This can be any component.
Process (114) Forms Generator
  Based on Business Logic definition and Application Intelligence, the Forms Generator generates the forms, GUI's, etc. on-the-fly which reduces the design time and efforts of the developers.
Process (115) Controls Generator
  Based on Business Logic definition and Application Intelligence, the Controls Generator generates the controls such as Date controls, text boxes, grids, etc. on-the-fly which reduces the design time and efforts of the developers.
Process (116) Search Generator
  Application Intelligence creates the default search engine and the search criteria and parameters can be updated by the user.
Process (117) Reports Viewer
  This component provides on-the-fly reporting capability to reduce user time and efforts and the advanced criteria selections which will be generated by Application Intelligence automatically.
Process (118) Translation Tools
  This tools reduces development time, the system will apply smart algorithm to translate between languages
Process (119) Drill Down
  Application Intelligence will understand database and Business Logic relations to help the user navigate the Business Data as much as possible.
Process (120) Workflow and Approvals
  This component provides Workflow and Approval mechanism.
Process (121) Advanced Component 'n'
  This can be any component.
Application Intelligence (Level 1)
Process (122) Data Structure and Relation Parser
  Parsing is made on first-time calling of data. Now, the system builds the Business Logic definition and this may be overwritten any time.

Example

Amount field of Float data type. The system will treat this as numeric and builds its control accordingly. If the user wants to create boundaries, he can overrides the system defaults and specify upper and lower limits.
  Relations are understood by the parser which helps mapping related data across tables and manipulating drilldown data.
Process (123) Meta Data Parser
  The Application Intelligence vocabulary list is used to parse meanings and data structure.

Example

Arabic or Hijri date, the system will look up "Hijri" term in the vocabulary list and see if anything relating to "Hijri" is defined before and use it by default and the user can change it.
Process (124) Business Logic Parser
  Another data source bank for Application Intelligence is to select the best possible definition.

Example

Nationality ID and Nationality Name list are to be created. The system will look in Business Logic and Business Data and if it finds similar control name, it will create the same controls for both fields to match the previously created controls and the user can change them. This reduces development time and efforts.
Process (125) Component Parser
  This parser analyzes the component itself to identify how it will function.

Example

Crystal Reports. Dealing with $3^{rd}$ Party applications needs to know the inside report structure, so it can extract the selection criteria to present it in the best possible user friendly way.
Process (126) Validations and Rules
  Standard validations and rules are created by default by the Application Intelligence like preventing string data entry into numeric controls. In addition to this, the user can right-click on any control and create his own rules on-the-fly.

Example

Right-click on "Customer—Create Rule" and create credit limit to this customer.
Process (127) Optimization Algorithms
  Due to the nature of how InnovBase works, analysis, drawing screens on-the-fly, displaying data in screens; several optimizing algorithms have been used like paging algorithm from Business Logic and Business Data. Another optimizing algorithm is used for data access using indexing and filtering.
Process (128) Application Intelligence "n"
  Any algorithm may be added to optimize system performance.
Data Access (Level 1)
Process (129) Reading Business Logic
  Business Logic structure that is defined in Data Repository is responsible for reading Business Logic.
Process (130) Writing Business Logic
  Business Logic structure that is defined in Data Repository is responsible for writing Business Logic.
Process (131) Reading Business Data
  GUID is used by the system to manage reading Business Data.
Process (132) Writing Business Data
  GUID is used by the system to manage writing Business Data.
Process (133) Transaction Manager
  Managing transaction concurrency on the database such as Begin—Commit process
Process (134) Data Access "n"
  Any data access method or functionality can be added.
Security (Level 1)
Process (135) Authentication
  Operating System or database authentication
Process (136) Connection Pooling
  Managing connection pooling
Process (137) Programming Mode
  New security protocol to access programming tools at runtime while viewing the data
Process (138) Encryption
  Advanced encrypting techniques such as user shadow to ensure security especially backdoor attempts
Process (139) System Audit and Log
  In addition to operating system and database logs, InnovBase has audit log for security purposes
Process (140) Security "n"
  Any security method or protocol can be added Business Logic Repository (Level 1)
   This is the details of the Business Logic Repository outlined in FIG. 1.6 ([141] up to [181])
Run-Time Programming Tools (Level 2)
Process (201) Selected Component
   This flowchart determines how this tool will function at run-time. The user is working with components like screens and menus. See FIG. 1.2 for more details
Process (202) Programming Tools Attached
   Are the programming tools attached? InnovBase will know of any attachments from security if the user is in Programming Mode
Process (203) Handel Component ID
   Determining the running component linked to which Business Data and determining components type
Process (204) Call Programming Tool
   As mentioned in Programming Tools 1.1, the desired programming tool is called which may be the Visual Editor or any other tool. See FIG. 1.1 for more details.
Process (205) Business Logic
   This is the related Business Logic to the selected component
Process (206) Reading Definitions
   Reading definitions from related Business Logic
Process (207) No Action
   No Action is taken if definition is not changed or programming tool not attached.
Process (208) Definition Changed
   The system will give the developer all selected component properties to update such as enabled or disabled, optional or mandatory, linked with other data sources, etc. These component propertied might as well be customized like Business Data which means that the system is using its own system component recursively which allows the developer to enhance the development tools themselves.
Process (209) Update Definitions
   The newly changed definition will be updated in the Business Logic repository and on the component
Process (210) Business Logic
   This is the related Business Logic to the selected component
Process (211) Apply New Definition on-the-fly
   The update definition scenarios mentioned earlier are done on-the-fly
System Components (Level 2)
Process (212) Call Main Component
   After the user successfully logs in, the system will launch the Main Component which contains the Main Menu and System Components.
Process (213) Is New Application
   The system checks if this is a registered application or new one. Then it checks if the Business Logic is available in the database to determine if registered or not. At the same time it also checks if there are any Service Packs or Updates and launches them as well.
Process (214) Reading Basic Definition
   If not a new application, it will read the Basic Component from the Business Logic then apply it.
Process (215) Business Logic
   Reading/Writing related to Basic Definitions.
Process (216) Reading User Profile
   Reading User Profile to apply user preferences.
Process (217) Creating Default Business Logic
   If new application, the system will create the database, default Business Logic structure and information.
Process (218) Business Logic
   Writing the newly created data to the Business Logic repository
Process (219) Business Logic
   Reading/Writing the newly created User Profile to the Business Logic repository
Process (220) Is New User
   Is this a new user?
Process (221) Applying User Profile
   If not new then apply User Profile
Process (222) Creating New Profile
   If new then create a new User Profile
Process (223) Applying Basic Components
   Now Basic Components are applied
Process (224) Call Advanced Component
   Basic Components will call Advanced Components as needed. The forthcoming scenario from Process (225) up to Process (234) is applied for most components
Process (225) Is Definition Available
   Is the called Definition available for that component?
Process (226) Call Application Intelligence
   If Definition is not available then call the Application Intelligence
Process (227) Parsing Data Structures
   See FIG. 1.3 and related elaboration
Process (228) Parsing Related Definition
   See FIG. 1.3 and related elaboration
Process (229) Create Best Definition
   See FIG. 1.3 and related elaboration
Process (230) Business Logic
   Application Intelligence will store Best Definitions in the Business Logic
Process (231) Reading Definition
   Read the Definitions
Process (232) Business Logic
   Related Business Logic to Advanced Components
Process (233) Apply Data Validation
   All applicable validations and rules are applied
Process (234) Apply Advanced Component
   Now, Advanced Components are applied
Data Access (Level 2)
Process (235) Selected Component
   The Selected Component could be any component; Form, Control, etc.
Process (236) Action
   What is the user action? Action type may be Save, Delete or Cancel. This is a proposed scenario and data access may have any type of Action or scenario other than the proposed one here.
Process (237) Dispose Component
   If Action is 'Cancel' then dispose the displayed component
Process (238) Begin Transaction
   If Action is 'Save' then the transaction manager will start the transaction
Process (239) Save Data
   If Action is 'Save' then the transaction manager will save the transaction
Process (240) Begin Transaction
   If Action is 'Delete' then the transaction manager will start the transaction
Process (241) Apply Before-Delete Events
   Apply all before-delete Events
Process (242) Delete Data
   If Action is 'Delete' then the transaction manager will delete the transaction Process (243) Call Validations and Rules
  Validations and Rules are called to check the saved or deleted data
Process (244) Accepted
  Are the validations and rules accepted?
Process (245) Apply Related Events
  If validations and rules are accepted then apply related events
Process (246) Request Approval Process
  Now request approvals
Process (247) Apply Workflow
  Now apply workflow, if 'Approved' then apply approval events and if 'Denied' then apply denial events
Process (248) Commit Transaction
  Commit the transaction after applying the workflow
Process (249) Business Data
  Write the committed transaction to Business Data
Process (250) Roll Back
  If validations and rules are not accepted then roll back related events
Process (251) Display Validations and Rules Messages
  If the transaction was rolled back then display the proper validations and rules messages
Security (Level 2)
Process (252) Start Logging
  Authentication screen is launched and user enters logging credentials
Process (253) Is Authorized
  Is the user authorized?
Process (256) Exit
  If the user is not authorized then exit the system
Process (257) Is Administrator or Programmer
  Is this user an administrator or a programmer?
Process (258) Password Shadow
  This is an advanced security method to prevent backdoor entry to the database, i.e. connecting natively to the database
Process (259) Is Programming Mode
  Is the logged in user logged in Programming Mode?
Process (260) Set Programming Mode
  If logged in Programming Mode then set Programming Mode
Process (261) Creating Connection
  Create connection
Process (262) Checking for Update
  Check for new updates
Process (261) Update Available
  Is there new updates
Process (262) Call Service Pack and Update Component
  If there are new updates then call Service Pack and Update component
Process (263) Business Logic
  Write the new updates to Business Logic
Process (264) Call Analyzer and Fix Component
Process (265) Call Basic Component
Process (266) Logging Completed

What is claimed is:

1. A real-time software development apparatus comprising:
  a storage which stores software application definitions; and
  a processor configured to:
    receive input data from an input unit,
    read the software application definitions from the storage;
    determine a relationship between the software application definitions and the received input data; and
    build an entire software application in run-time based on the relationship between the software application definitions and the received input data independent of compiling the software application definitions.

2. The real-time software development apparatus of claim 1, wherein the software application definitions are stored in structured database tables.

3. The real-time software development apparatus of claim 1, wherein the software application is a dynamic business application.

4. The real-time software development apparatus of claim 1, wherein initial creation of the software application is independent of compiling the software application definitions.

5. The real-time software development apparatus of claim 1, wherein all elements of the software application are built independent of compiling the software application definitions.

6. A real-time software development method comprising:
  receiving input data from an input unit,
  reading software application definitions from a storage;
  determining a relationship between the software application definitions and the received input data; and
  building an entire software application in run-time based on the relationship between the software application definitions and the received input data independent of compiling the software application definitions.

7. The real-time software development method of claim 6, wherein the software application definitions are stored in structured database tables.

8. The real-time software development method of claim 6, wherein the software application is a dynamic business application.

9. The real-time software development method of claim 6, wherein initial creation of the software application is independent of compiling the software application definitions.

10. The real-time software development method of claim 6, wherein all elements of the software application are built independent of compiling the software application definitions.

11. A non-transitory computer readable medium having stored thereon a program for executing a real-time software development method, the method comprising:
  receiving input data from an input unit,
  reading software application definitions from a storage;
  determining a relationship between the software application definitions and the received input data; and
    building an entire software application in run-time based on the relationship between the software application definitions and the received input data independent of compiling the software application definitions.

12. The non-transitory computer readable medium of claim 11, wherein the software application definitions are stored in structured database tables.

13. The non-transitory computer readable medium of claim 11, wherein the software application is a dynamic business application.

14. The non-transitory computer readable medium of claim 11, wherein initial creation of the software application is independent of compiling the software application definitions.

15. The non-transitory computer readable medium of claim 11, wherein all elements of the software application are built independent of compiling the software application definitions.

* * * * *